United States Patent
Sonthonnax et al.

(10) Patent No.: US 9,656,433 B2
(45) Date of Patent: May 23, 2017

(54) METHOD OF MANUFACTURING AN ELEMENT FORMING AN EYEGLASS FRAME, AND ELEMENT OBTAINED BY SAID METHOD

(71) Applicants: Alexandre Sonthonnax, Geneva (CH); Plastinax Austral Ltd., St. Pierre (MU)

(72) Inventors: Alexandre Sonthonnax, Geneva (CH); Didier Rougier Lagane, Floreal (MU)

(73) Assignees: Plastinax Austral Ltd., St. Pierre (MU); Alexandre Sonthonnax, Geneva (CH)

( * ) Notice: Subject to any disclaimer, the term of this patent is extended or adjusted under 35 U.S.C. 154(b) by 0 days.

(21) Appl. No.: 14/521,791

(22) Filed: Oct. 23, 2014

(65) Prior Publication Data
US 2015/0116653 A1    Apr. 30, 2015

(30) Foreign Application Priority Data
Oct. 31, 2013  (FR) ...................................... 13 60703

(51) Int. Cl.
G02C 5/14    (2006.01)
B29D 12/02   (2006.01)
(Continued)

(52) U.S. Cl.
CPC .......... B29D 12/02 (2013.01); B29C 45/1671 (2013.01); G02C 5/02 (2013.01);
(Continued)

(58) Field of Classification Search
CPC ...... B29C 45/1671; B29D 12/02; G02C 5/02; G02C 5/18; G02C 7/108; B29K 2077/00;
(Continued)

(56) References Cited

U.S. PATENT DOCUMENTS

| | | | | | |
|---|---|---|---|---|---|
| 2,997,917 | A | * | 8/1961 | Baer ........................ | G02C 5/00 2/442 |
| 4,013,747 | A | * | 3/1977 | Hampel .................. | B29B 13/00 264/234 |

(Continued)

FOREIGN PATENT DOCUMENTS

| FR | 2 655 162 A1 | 5/1991 |
|---|---|---|
| JP | 64-044415 A1 | 2/1989 |

(Continued)

OTHER PUBLICATIONS

French Search Report (Application No. 13.60703) dated Jul. 3, 2014.

*Primary Examiner* — Huy K Mai
*Assistant Examiner* — Daniele Manikeu
(74) *Attorney, Agent, or Firm* — Charles A. Lemaire; Jonathan M. Rixen; Lemaire Patent Law Firm, P.L.L.C.

(57) ABSTRACT

This method of manufacturing an element forming part of an eyeglass frame includes the steps of: manufacturing by molding by injection of plastic material two layers of the element to be manufactured of the eyeglass frame; overmolding by means of these two layers a central core, to obtain an eyeglass frame element comprising three layers, its first and second layers forming external layers and its central core forming an internal layer.

18 Claims, 3 Drawing Sheets

(51) Int. Cl.
*G02C 5/18* (2006.01)
*G02C 5/02* (2006.01)
*B29C 45/16* (2006.01)
*B29K 77/00* (2006.01)
*B29K 705/00* (2006.01)
*B29K 105/00* (2006.01)
*B29L 9/00* (2006.01)
*B29L 12/00* (2006.01)

(52) U.S. Cl.
CPC ............ *G02C 5/18* (2013.01); *B29K 2077/00* (2013.01); *B29K 2105/0032* (2013.01); *B29K 2705/00* (2013.01); *B29L 2009/00* (2013.01); *B29L 2012/005* (2013.01)

(58) Field of Classification Search
CPC ........ B29K 2105/0032; B29K 2705/00; B29L 2009/00; B29L 2012/005; G02B 1/10; G02B 1/115; G02B 1/14
USPC ......... 351/178, 159.66, 139, 159.29, 159.62, 351/111, 41; 264/1.7, 211, 219, 2.7, 2.5, 264/129, 1.1, 245, 78; 428/423.1
See application file for complete search history.

(56) References Cited

U.S. PATENT DOCUMENTS

| | | | | |
|---|---|---|---|---|
| 4,665,598 A | * | 5/1987 | Murai | B44F 1/063 29/20 |
| 2007/0002271 A1 | * | 1/2007 | Rancan | G02C 5/00 351/41 |
| 2007/0122626 A1 | | 5/2007 | Qin et al. | |
| 2007/0254140 A1 | * | 11/2007 | Zou | B44C 1/17 428/204 |
| 2008/0260994 A1 | * | 10/2008 | Nakanishi | G02C 3/003 428/133 |
| 2009/0174860 A1 | * | 7/2009 | Lam | B32B 27/08 351/51 |
| 2013/0069274 A1 | | 3/2013 | Zhang et al. | |

FOREIGN PATENT DOCUMENTS

| | | |
|---|---|---|
| KR | 872314 B1 | 12/2008 |
| KR | 2012064485 A1 | 6/2012 |
| KR | 101317591 B1 | 10/2013 |
| WO | WO9956942 | 11/1999 |
| WO | 2010/078687 A1 | 7/2010 |

* cited by examiner

METHOD OF MANUFACTURING AN ELEMENT FORMING AN EYEGLASS FRAME, AND ELEMENT OBTAINED BY SAID METHOD

FIELD OF THE INVENTION

The present invention relates to the technical field of eyeglass frames and more specifically relates to a method of manufacturing an element forming an eyeglass frame.

"Element forming an eyeglass frame" particularly means one of the branches, or both, or the bridge of said eyeglass frame receiving the optical or sun or safety lenses.

The invention also relates to an element obtained by the manufacturing method according to the present invention.

BACKGROUND

It is known in the state of the art to manufacture laminated plastic eyeglass frames made of three layers of different colors. Such eyeglass frames are generally formed by machining of laminated plates of acetate plastic material already colored as requested.

Such frames have the disadvantage of developing a poor mechanical stability and that layers sometimes separate.

Another disadvantage also lies in the fact that frames of the state of the art sometimes lose their color over time.

Another disadvantage lies in the fact that designers of state of the art eyeglass frames have a limited color choice and rather deploy their creativity in the shape of said frames to improve their sales number.

SUMMARY OF THE INVENTION

One of the aims of the invention thus is to overcome these disadvantages by providing a method of manufacturing an element forming an eyeglass frame having a good mechanical and physico-chemical stability and which enables to almost indefinitely vary the colors of said element.

Another object of the invention is to provide such a manufacturing method which is easy to implement and has a manufacturing cost economically compatible with market needs.

Another object of the invention is to provide a frame element which does not lose its color over time.

To achieve this, and according to the invention, such a method, remarkable in that it comprises the steps of, first, manufacturing by molding by injection of plastic material two layers of the element to be manufactured of the eyeglass frame, has been developed. The method according to the invention then comprises the step of overmolding a central core, made of plastic material, said first and second layers being arranged on either side of the central core.

According to the invention, the central core is made of plastic material and is also manufactured by molding by injection of plastic material, in a third mold, to form a third layer of the element to be manufactured, overmolded with the first and second layers arranged on either side of said third layer.

According to this method, an eyeglass frame element comprising three layers is obtained, its first and second layers forming external layers, and its third layer forming an inner layer.

According to this first embodiment, the three previously-mentioned layers are shaped during the injection by molding, according to the desired shape of the eyeglass frame element to be formed.

According to a second embodiment of the invention, the three layers are formed by injection in the form of a plate. In other words, they are not shaped during their injection according to the desired shape of the element to be formed. The three-layer plate then obtained is machined to be able be given said desired shape of the eyeglass frame element.

This embodiment enables to decrease the cost of the equipment, and particularly of the molds, and further enables to manufacture small series with decreased equipment costs.

The method according to the invention allows a large-scale manufacturing of the considered eyeglass frame element. The method enables at the same time to give a specific shape to the element, but also to obtain a fine melting of the three layers forming the element, which provides an excellent mechanical and physico-chemical stability of said element.

According to the invention, the first and second layers are manufactured in two different molds, to be able to manufacture at the same time the first and second layers, and thus to decrease the total manufacturing time of the eyeglass frame element and particularly to increase the cost effectiveness.

Preferably, the injected layers are dyed in the mass of the molten material by the use of liquid dyes containing no heavy metal. The obtained eyeglass frame element thus has a uniform color, with no apparent vein, spot, or other defect resulting from the coloring. The mixture of liquid dyes and of plastic material enables to manufacture eyeglass frame elements in an infinite variety of colors as requested.

The risk of color fading is thus eliminated. Further, such dyes contain no heavy metal, and thereby comply with the regulations in force.

Preferably, the first, second, and third layers are obtained by injection of polyamide material, and advantageously of polyamide 12. Other plastic materials may however be envisaged.

The use of a polyamide 12 is advantageous since this material has remarkable properties. Indeed, it is resistant to heat deformations and is relatively stable when confronted to chemical agents. Further, its exceptional transparency among current plastic materials enables to use dyes which vary not only its crystalline hue, but also its opacity.

Preferably, the manufactured element is then coated with a varnish, and advantageously with a polyurethane-based varnish.

This feature particularly enables to protect the surface of the considered element, but also to make it look new with a reasonable lifetime. The varnishing enables to have an element with a shiny or matt finish, as requested.

According to a variation of the invention, the central core is formed of a metal insert which may be solid or provided with through openings and overmolded with said first and second layers.

The invention also relates to an element forming an eyeglass frame, such as, for example, one of the branches, or the bridge of the optical, sun, or safety glasses, comprising two external layers made of plastic material overmolded on a third internal layer made of plastic material.

DETAILED DESCRIPTION

Figure 1:
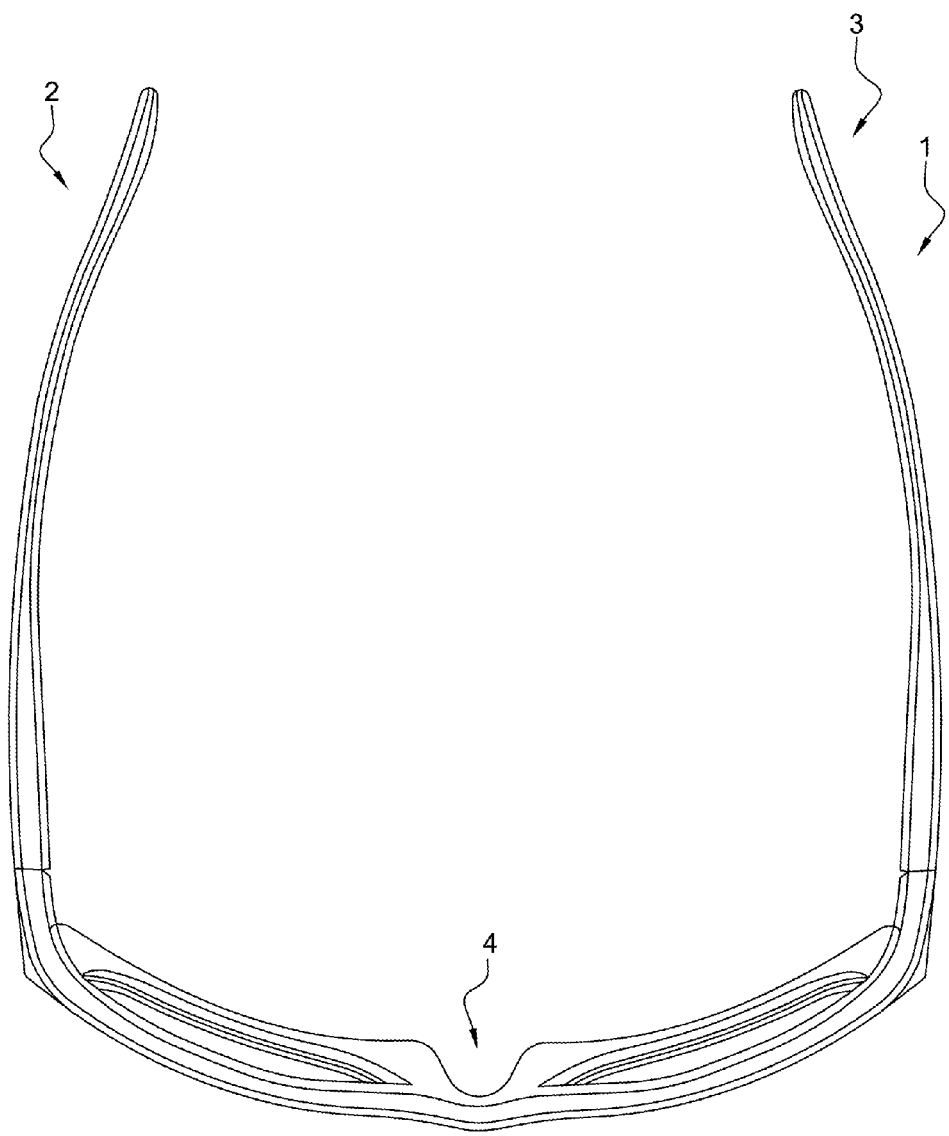
FIG. 1 is a simplified top view of an eyeglass frame formed according to the invention.
Figure 2:
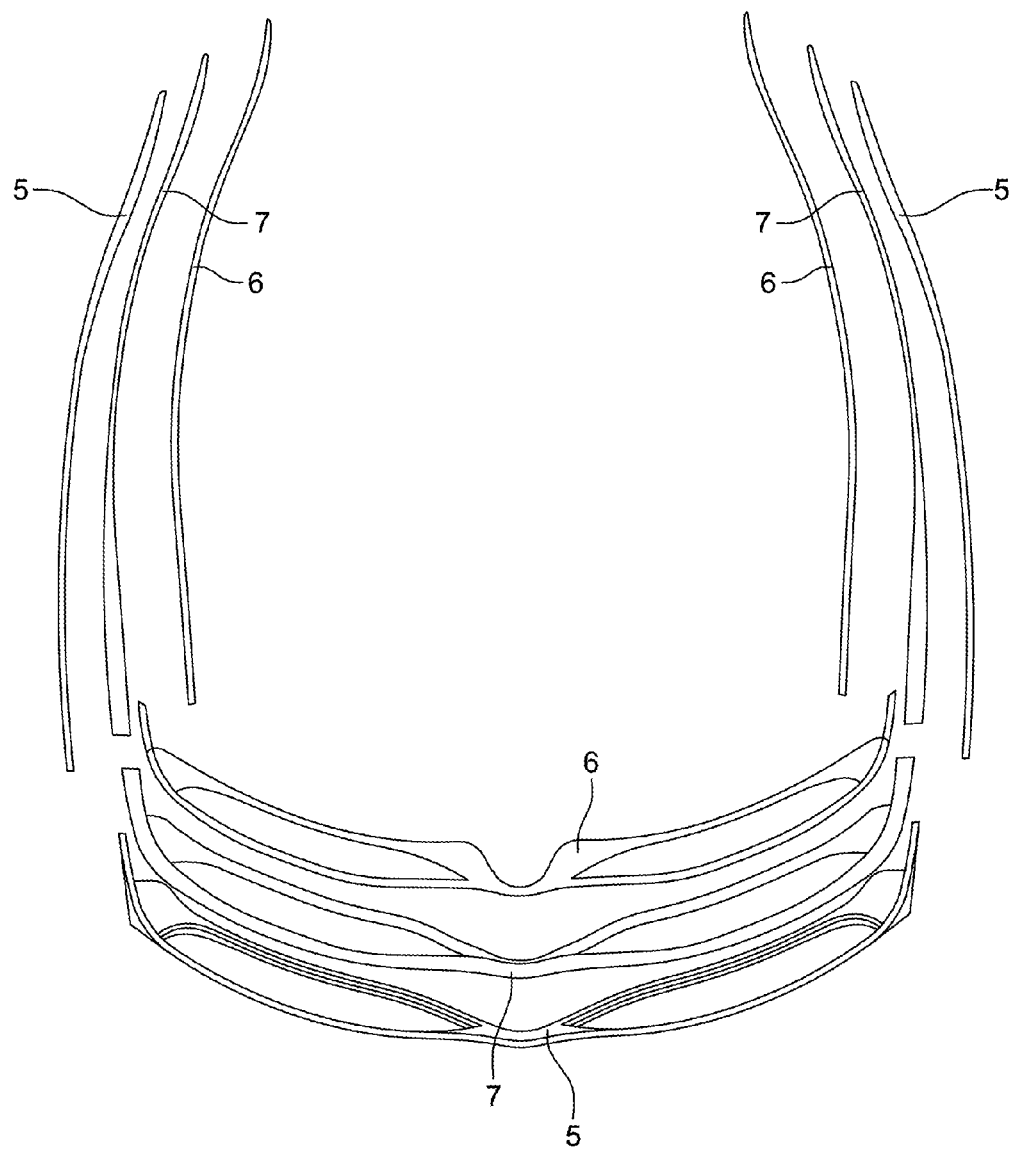
FIG. 2 is an exploded view of FIG. 1.
Figure 3:
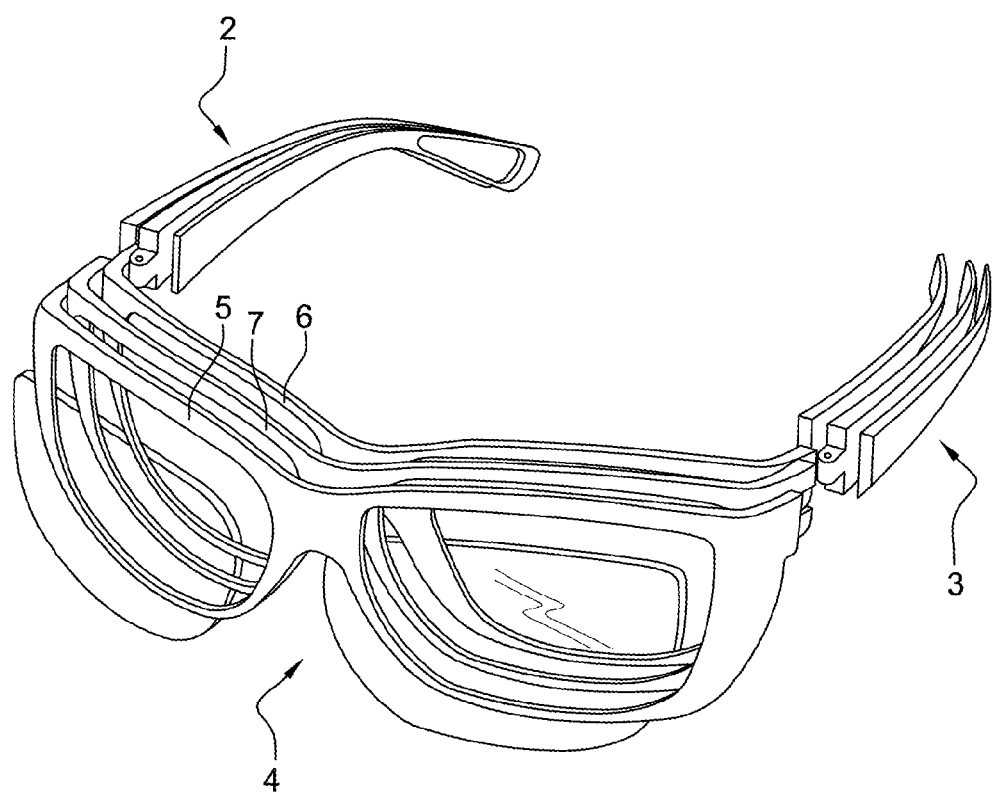
FIG. 3 is a simplified perspective view of the eyeglass frame of FIG. 1.

The invention relates to a method of manufacturing an element forming an eyeglass frame (1), such as, for example, the branches (2, 3) and/or the bridge (4) of the frame receiving the optical lenses.

According to a first embodiment of the invention, the method first comprises a step comprising, first, manufacturing by injection molding of polyamide 12 mixed with a liquid dye two layers (5, 6) of the eyeglass frame element to be manufactured. The dyes may be different for said two layers of the element to be manufactured.

These two layers (5, 6) may also be simultaneously manufactured in two different molds.

The method according to the invention then comprises a step of manufacturing, by injection molding of polyamide 12 mixed with a liquid dye, in a third mold, a third layer (7) of the element to be manufactured, overmolded with the first (5) and second (6) layers arranged on either side of said third layer within this third mold. It is then spoken of a tri-injection manufacturing.

Each of these layers has a thickness of at least 0.9 millimeter.

According to this method, an eyeglass frame element comprising three polyamide 12 layers of identical colors or each having a different color, is obtained, its first and second layers forming external layers, and its third layer forming an inner layer. The cohesion of the assembly thus obtained results from the at least partial melting of each of the three layers on overmolding of the third layer.

The obtained element is then coated with a polyurethane-based varnish to protect its surface and also give it a shiny or matt finish as requested.

The invention requires using three molds made of steel grades having the best resistance to wearing, corrosion, and deformation due to the heating temperature and to the locking pressure exerted by the injection press for the injection as such.

According to a variation of the invention, said first (5) and second (6) layers overmold a metal insert which may be solid or pierced with through openings, the latter being intended to allow the migration of the plastic material forming said first and second layers.

According to a second embodiment of the invention, the three layers are also formed by injection molding, in the same way as for the previously-described method, except that said layers are not given the desired shape of the eyeglass frame element to be formed.

Actually, a three-layer plate formed of the assembly of the two external layers and of the internal layer is obtained.

This plate is then submitted to a machining capable of giving the desired shape to the eyeglass frame element to be formed.

As appears from the foregoing, the invention allows the mass production with an almost infinite variety of colors of an eyeglass frame element. The manufacturing is cost-effective.

Further, the invention has the advantage of significantly decreasing the manufacturing delays of such eyeglass frames, since acetate is not used, the manipulation of acetate being traditionally longer and more difficult to implement.

The invention claimed is:

1. A method of manufacturing an element of an eyeglass frame, the method comprising:

manufacturing two layers, a first layer and a second layer, of the element to be manufactured of the eyeglass frame, wherein the manufacturing of the two layers includes injection molding a plastic material; and molding a central core between the first layer and the second layer after manufacturing the first molded layer and the second molded layer to obtain the element of the eyeglass frame.

2. The method of claim 1, wherein the molding of the central core includes injection molding a plastic material.

3. The method of claim 1, wherein the first and second layers are manufactured in two different molds.

4. The method of claim 1, wherein the manufacturing of the first layer includes mixing a liquid dye with a molten material and injection molding the mixed dye and molten material into a mold.

5. The method of claim 1, wherein the manufacturing of the two layers and the molding of the central core includes injection molding a polyamide 12.

6. The method of claim 1, wherein each of the three layers is shaped by molding to a desired shape of the element to be formed.

7. The method of claim 1, wherein the three layers are assembled in the form of a three-layer plate, and wherein the three-layer plate is shaped by machining a desired shape of the element to be formed.

8. The method of claim 1, further comprising:

coating the manufactured element with a varnish that includes a polyurethane.

9. An element forming part of an eyeglass frame, the element comprising:

two external layers made of plastic material; and an injection molded third internal layer made of plastic material, said element being obtained according to a method comprising:

manufacturing a first outer layer and a second outer layer of the element to be formed from a plastic material; and molding a central core between the first layer and the second layer after manufacturing the first molded layer and the second molded layer to obtain the eyeglass frame element comprising three layers.

10. An apparatus for manufacturing an element of an eyeglass frame, the apparatus comprising:

means for manufacturing two molded layers to form a first molded layer and a second molded layer of the element to be manufactured of the eyeglass frame from a plastic material; and means for molding a central core between the first molded layer and the second molded layer after forming the first molded layer and the second molded layer in order to obtain an eyeglass frame element comprising three layers.

11. The apparatus of claim 10, wherein the means for molding the central core includes means for injection molding a plastic material.

12. The apparatus of claim 10, wherein the means for manufacturing two molded layers includes two different molds.

13. The apparatus of claim 10, wherein the means for manufacturing two layers includes means for mixing a liquid dye with a molten material and injection molding the mixed dye and molten material into a mold.

14. The apparatus of claim 10, wherein the means for manufacturing two layers includes means for injection molding a polyamide 12.

15. The apparatus of claim 10, wherein the means for molding the central core includes means for injection molding the central core between the first molded layer and the second molded layer to form a plate and wherein the apparatus further includes means for shaping a desired shape of the element to be formed from the plate.

16. The apparatus of claim 10, wherein the central core, the first molded layer and the second molded layer are assembled in the form of a three-layer plate, and wherein the apparatus further includes means for machining a desired shape of the element to be formed from the three-layer plate.

17. The method of claim 1, wherein the molding of the central core includes dyeing a material of the central core by mixing a liquid dye with the material of the central core during the molding of the central core.

18. The method of claim 4, wherein the liquid dye contains no heavy metal.

* * * * *